March 27, 1973   J. A. MacDONALD   3,723,234

KNIT REINFORCING FABRIC AND RESIN LAMINATE

Filed April 27, 1971

INVENTOR
John A. MacDonald

BY

ATTORNEYS

United States Patent Office 3,723,234
Patented Mar. 27, 1973

3,723,234
KNIT REINFORCING FABRIC AND
RESIN LAMINATE
John A. MacDonald, Hockessin, Del., assignor to
Chapman Industries Inc., Avondale, Pa.
Filed Apr. 27, 1971, Ser. No. 137,791
Int. Cl. B32b 27/04, 27/06; B65d 25/14
U.S. Cl. 161—89
5 Claims

ABSTRACT OF THE DISCLOSURE

A reinforced fabric and resin laminate wherein the interlaced fabric imparts dimensional stability and strength to the resin component, while the knit character thereof permits shaping the fabric or the composite laminate over irregular or curved surfaces as well as permitting extension of the embedded fabric with elongation of the resin, in addition to enhancing the mechanical bond to the resin.

---

The present invention relates to a reinforced fabric-resin composite structure or laminate, and particularly to a fabric-reinforced structure characterized by the ability of the interlaced fabric to be formed over irregular and complexly curved surfaces while yet imparting the requisite dimensional stability and strength to the plastic component of the laminate structure.

Reinforced laminates are used in commercial and industrial environments, particularly in handling of chemicals and the like wherein inertness to chemical reaction or attack, and corrosion resistance is necessary, as in tank liners, valve members and the like.

While it is conventional practice to effect reinforcement of plastic or thermoplastic films by embedding diverse elements therein, problems are frequently encountered, such as, reliable bonding of the reinforcement to the plastic material, the extensibility of the embedded fabric or other reinforcement as compared with the thermal expansion characteristics of the plastic or thermoplastic film material, or the ability of the reinforcement to conform to configured or irregular surfaces to which the plastic component is readily shaped without rupture or delamination of the reinforcing material.

It is, therefore, an object of the present invention to provide a reinforced resin structure which exhibits excellent dimensional stability.

It is a further object of the present invention to provide a resin laminate characterized by an especial ability to conform to an irregular or curved contour.

It is a further object of the present invention to provide an efficient technique for fabricating such a laminate.

It is an additional object of the invention to provide a laminate whose principles may be adopted with diverse resins such as thermoplastic films and various reinforcing fabrics of resins, mineral fibers, etc.

Other objects and advantages of the present invention will become more readily apparent from the following detailed description taken in connection with the accompanying drawings, in which.

Figure 1:
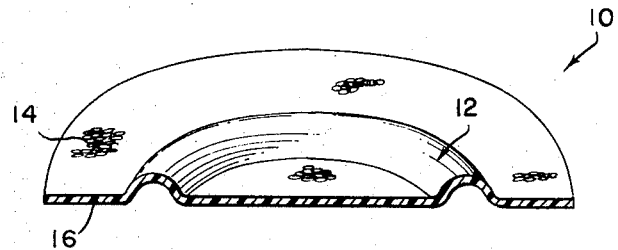
FIG. 1 is a perspective view, partly in section, of an exemplary article formed from the laminate of the invention.

Referring now to the drawings, in the exemplary form the laminate structure comprises an article 10 which includes a bowed area 12 illustrative of a curved or relatively complexly contoured configuration that the laminate of the present invention may require for use in a particular environment.

Such complexly contoured laminates have many uses in the chemical and industrial arts as in linings for vessels such as chemical tanks, pipes, valve housings, diaphragm valve elements, and numerous others as is obvious.

The laminate comprises two chief components, namely an interlaced fabric 14 and a resin film 16. The fabric may be formed from any conventional fiber that might be desired to be used as a reinforcing laminate, such as natural or synthetic fibers, including, for example, glass, metallic fibers, and polymeric fibers.

Prior to my invention, in order to provide sufficient elongation and shaping capability commensurate with that of the surrounding plastic web or film, the reinforcing fabric necessarily had to be chosen from those fibrous materials having sufficient elongation capabilities to accommodate the extension that may occur.

With the present invention, however, fibers having only moderate or indeed even low elongation properties may be utilized successfully as reinforcing fabrics for plastic films.

The film or sheet structure 16 may be any desired organic polymeric material whose reinforcement is sought such as polyethylene, polypropylene, polyvinylidene fluoride, polyvinyl fluoride and copolymers thereof, such as, for example, copolymers of ethylene with vinyl acetate, methyl acrylic acid, propylene, etc., including also blends of such polymers as, for example, a blend of low density polyethylene with high density polyethylene. The fluorocarbon polymers such as polytetrafluoroethylene (PTFE) and copolymers of tetrafluoroethylene and hexafluoropropylene (FEP) are found to be highly desirable.

The feature of the instant construction which contributes to the success thereof is that the fabric component is a knit fabric as distinguished from an ordinary conventionally woven fabric. Knit fabric in any conventional form embraces a series of interlocking or interlaced loops whereby the fabric is inherently capable of substantial extension in any direction as may occur upon elongation of the laminate under operating temperatures or mechanical stresses.

By contrast, conventional reinforcing fabrics of the usual woven character having any well-known crisscross weave are incapable of sufficient extension or elongation along either major axis of the fiber weave, and as such cannot accommodate the necessary elongation as may be encountered without rupture, undue distortion, or delamination of the fabric from the film. The existence of the knit loops or "accordion-like" pattern of the fibers in a knit fabric permits the fabric to stretch and yield universally as the plastic material to which the same is bonded undergoes stress.

Figure 2:
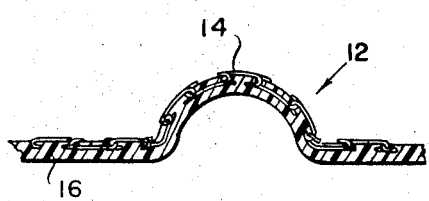
FIG. 2 is an enlarged fragmentary sectional view of the article of FIG. 1.

As schematically seen in FIGS. 1 and 2, the loop knit fabric 14 is present at the surface of the composite laminate structure 10. Depending upon the proximity of the fabric to the surface of the thermoplastic component 16, the laminate will have a diversely textured appearance and roughened feel which may enhance its utility in diverse environments, as well as provide a relatively rough surface to which further film lamination may be effected.

Figure 3:
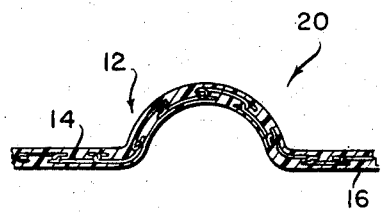
FIG. 3 is an enlarged fragmentary sectional view of a modified laminate formed according to the invention.

In the modification of FIG. 3, the knit fabric is fully embedded or sandwiched within the thermoplastic component, whereby the thermoplastic film presents a substantially smooth exterior surface to the laminate on either side of the fabric 14.

Figure 4:
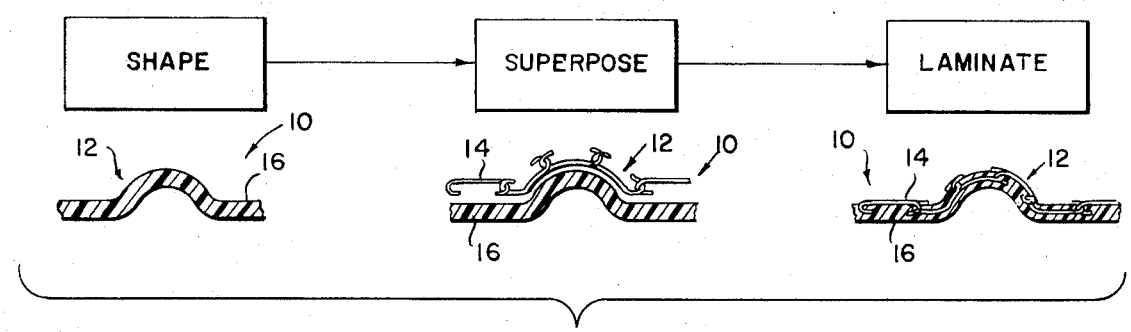
FIG. 4 is a composite diagrammatic view illustrating the several steps in one technique of fabricating the laminate structure of the invention.

A preferred mode of fabricating the laminate of the invention is shown in FIG. 4. Thus, initially the thermoplastic film 16 is shaped or contoured as desired as at 12 to substantially the complex or curved contour sought for the final laminate. Thereafter, the knit fabric 14 is superposed over and upon the shaped film, conforming readily to the contour thereof by virtue of the looped interlacing character of the knit.

Finally, under the requisite heat and pressure as particularly determined for the knit fabric and film employed, the knit fabric is embedded and sealed to and within the plastic film to produce the laminate 10.

While in the fabrication technique of FIG. 4 there is illustrated the fabric 14 as associated with a single sheet or web of film 16 to produce the laminate of FIGS. 1 and 2, the invention further contemplates the formation of a "sandwich" laminate wherein the fabric 14 is initially disposed between two separate sheets of film 16. With the latter arrangement, and following the sequence of steps of FIG. 4, it will be seen that the fabric will be fully embedded in the plastic wherein the upper and lower sheets 16 will fuse together into an integral homogeneous mass reinforced by the knit fabric, and will in this instance produce the modified laminate 20 of FIG. 3 having the smooth upper and lower surfaces.

While the dimensions of the fiber employed in the fabric are not critical, we have found that smaller diameter filaments or fibers in the knit produce the most desirable properties in the resultant laminate. Thus, smaller fibers provide more flexibility as well as an increased fabric surface area with which to effect a firm bond with the thermoplastic film.

In one specific example, the knitted yarn was formed from TFE fiber, with each strand being approximately .004" in diameter. The sample fabric counted about 25 looped strands per inch. Such a fabric is quite soft to the touch and is easily shaped in forming the laminate.

The mechanical bond formed by the interlaced, looped fibers of the sheet 14 with the film 16 is particularly important where the fibers are formed from a material that is substantially non-adhesive receptive and accordingly are not easily or securely bonded to another material in an untreated state. Such fibers include those of polyethylene, polypropylene, TFE, FEP, etc.

As indicated, any fiber that can be knitted may be employed, and which also has temperature stability at the temperature or temperatures required for embedment with the thermoplastic to be used, including metal, polyimide, glass fibers, carbon fibers, graphite fibers, ceramic fibers, asbestos fibers, etc., regardless of its elongation capability.

The following are examples of laminates produced according to the present invention:

A composite laminate 10 was formed from a thermoplastic film 14 comprising fluorinated ethylene propylene fluorocarbon film (FEP) having an initial thickness of .020 inch. The knit fabric was a monofilament of TFE comprising a higher polymer of Teflon. In this example, the "sandwich" technique to produce a laminate of FIG. 3 at 20 was employed wherein the materials were superposed as a flat laminate with the knit fabric disposed between pre-shaped upper and lower sheets of the FEP film.

Initially, the film was vacuum formed in the shape of a disc 15 inches in diameter which had approximately ⅝" depth convolutions of ¼" width disposed concentrically of the center of the disc. Thereafter an interposed layer or inner layer of knit TFE fiber fabric was placed between the two shaped film layers. Inside and outside tools were placed over the layup, and the assemblage heated to about 540° F. at approximately 20 p.s.i. As soon as temperature was reached, the heat was cut off, the unit cooled to approximately 100° F., and the completed laminated part removed with the knit fabric reinforcement fully embedded within the now fused thermoplastic sheets thereby producing a laminated film as at 20, FIG. 3.

In a second example, the materials were fabricated by forming a flat laminate which was inserted between forming tools and the temperature was raised above 525° F. and the pressure above 25 p.s.i. after which the part was cooled to room temperature.

In a third example, superposed sheets of knit glass fiber and thermoplastic film were secured on a peripheral frame in a conventional vacuum forming machine. The two layers, after heating, were vacuum formed to a contour comparable to that of FIG. 1 and wherein as a consequence thereof the knit fabric partially embedded into and interlocked with the thermoplastic sheet.

A pipe manufactured with FEP and a glass fiber web in accordance with the invention and thereafter covered with an FRP (polyester) layup can be an excellent system for extremely corrosive chemical service. The permeability of the layers is about equal, while yet good for full vacuum up to about 24" in diameter. Other materials might be preferable for greater diameters.

While it is possible to superpose the requisite number of fabric and film layers and thereafter contour or convexly curve the same, I have found it preferable that plastic film first be contoured to the desired shape as seen in FIG. 4. Only thereafter is the knit fabric superposed in suitable shaped relation to the shaped film, the contour being easily partaken of by the fabric by virtue of the knit character thereof as aforesaid. This is followed by the heat and pressure lamination.

In this regard, this preferred sequence of steps minimizes fabric distortion during the laminating process and tends to ensure that the fabric will lie substantially uniformly throughout the final laminate. In contrast, if the fabric and film are initially superposed in substantially planar relation prior to curving or shaping thereof, there may be a tendency for the fabric to draw closely against the concave portion of the curve, i.e. near the underside surface of the shaped portion 12 in the illustrative embodiment, whereby the fabric becomes non-uniformly disposed within the plastic layer or layers.

It is thought that the invention and many of its attendant advantages will be understood from the foregoing description, and it will be apparent that various changes may be made in the form, construction and arrangement of the parts without departing from the spirit and scope of the invention, the forms hereinbefore describing merely various preferred embodiments thereof.

What I claim is:

1. A reinforced laminate for use in complexly contoured locations subject to chemical attack, comprising:
    a knit reinforcing fabric formed from fibers having low elongation characteristics, said fibers being chosen from the group consisting of fluorine-containing plastic material, mineral and metallic,
    a film of fluorine-containing plastic material having a preshaped complexly curved contour,
    said fabric being embedded within and mechanically interlocked with said film,
    said film having one smooth surface in spaced relation to the fabric embedded therein,
    said laminate having substantially the configuration of said preshaped complexly curved contour.

2. The article of claim 1 wherein said fabric is immediately adjacent one exterior surface of the laminate, and projects therefrom to provide a readily bondable exterior surface.

3. The article of claim 1 wherein the fabric is completely embedded within the film component.

4. The laminate of claim 1, wherein said fabric comprises a fluorine-containing plastic material, and said laminate is contoured to form an interior lining for chemical reaction vessels.

5. The laminate of claim 2, wherein said laminate is tubular and includes an outwardly flared flange at one end thereof, and wherein the fabric face of said laminate is on the exterior to effect bonding to the inner wall and end flange of a pipe section.

References Cited

UNITED STATES PATENTS

| | | | |
|---|---|---|---|
| 2,947,325 | 8/1960 | McFarland, Jr. | 156—293 X |
| 3,607,594 | 9/1971 | Mancel | 161—189 X |
| 2,991,808 | 7/1961 | Siegmann et al. | 156—294 X |
| 2,674,644 | 4/1954 | Goodloe | 161—89 X |
| 3,446,686 | 5/1969 | Butler et al. | 161—89 X |
| 3,423,263 | 1/1969 | Pannone | 161—89 X |
| 3,030,248 | 4/1962 | Runton | 161—95 |

PHILIP DIER, Primary Examiner

U.S. Cl. X.R.

156—293, 303.1; 161—95, 189; 220—63, 83